Feb. 28, 1933.  H. E. BIRKHOLZ  1,899,007
RENEWABLE FILTER
Filed Aug. 10, 1927   2 Sheets-Sheet 1
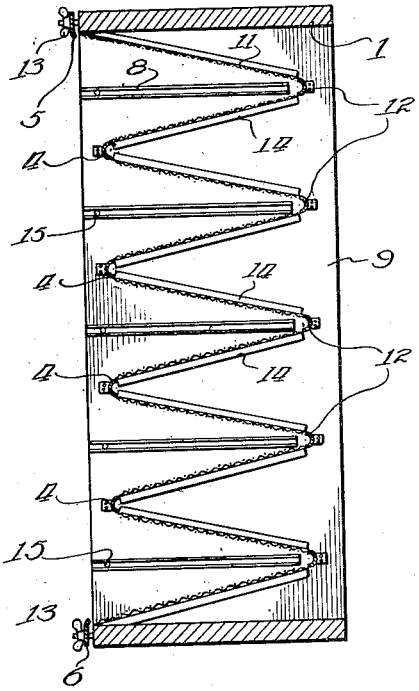
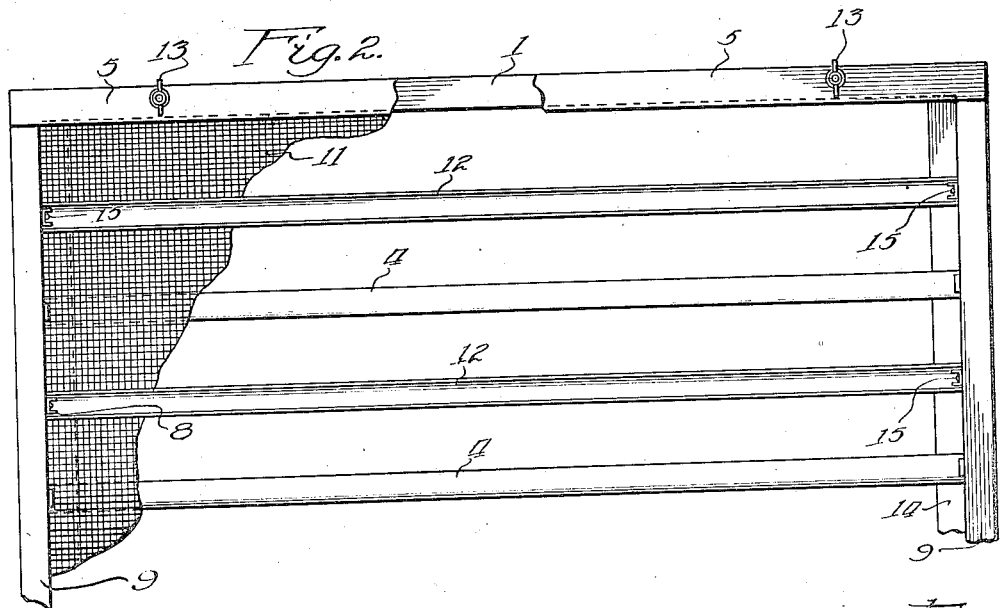
Witnesses
Arthur M. Framke
John E. Titus
Inventor:
Hans E. Birkholz.
Pummler & Pummler
Attys.

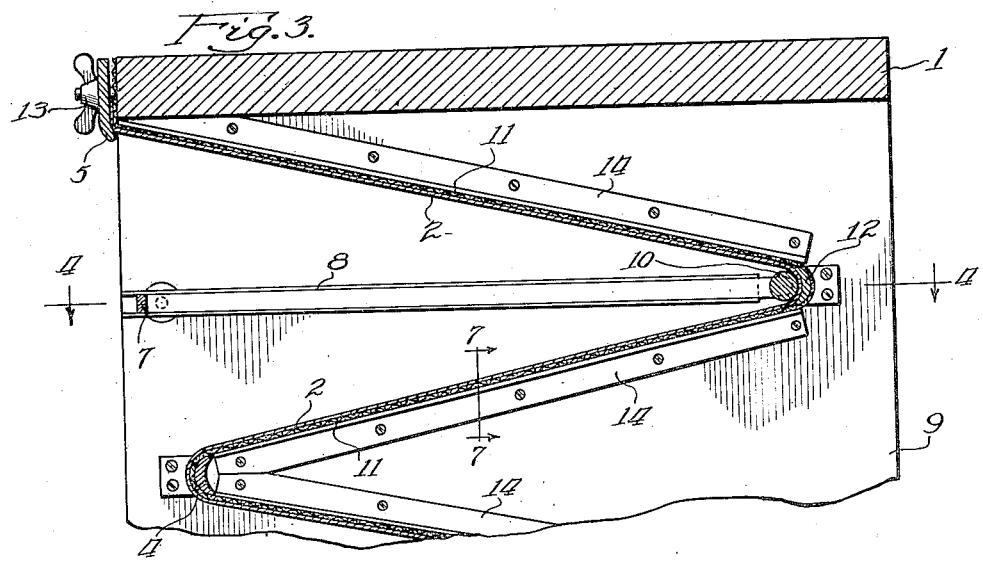
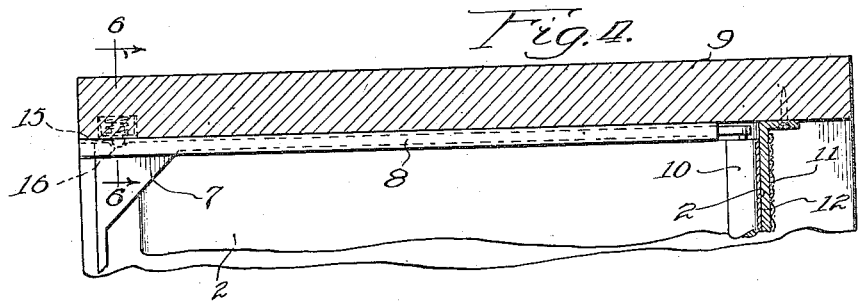
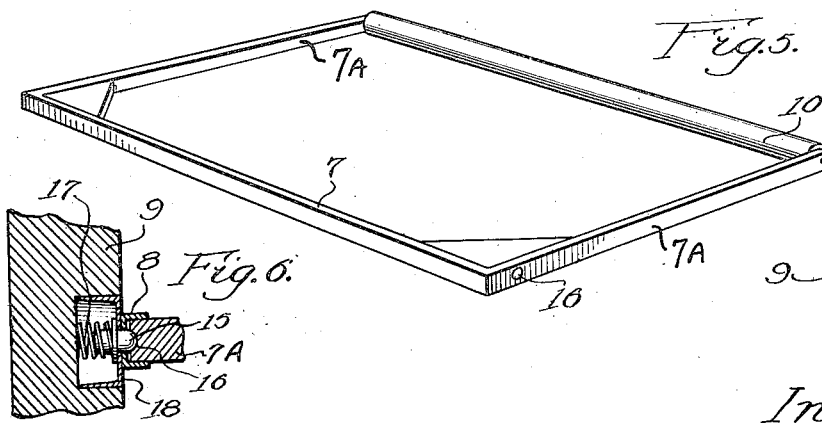
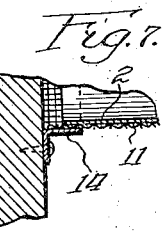

Patented Feb. 28, 1933

1,899,007

UNITED STATES PATENT OFFICE

HANS E. BIRKHOLZ, OF CHICAGO, ILLINOIS, ASSIGNOR, BY MESNE ASSIGNMENTS, TO AMERICAN AIR FILTER COMPANY, INC., OF LOUISVILLE, KENTUCKY, A CORPORATION OF DELAWARE

RENEWABLE FILTER

Application filed August 10, 1927. Serial No. 211,948.

This invention relates to improvements in filter units adapted for cleaning air or gas, and is chiefly characterized by having a fibrous or paper-like filtering medium which may be discarded when it has become filled with dirt and which may be replaced with little difficulty.

For handling, commercially, large volumes of air, two classes of air cleaners have been more commonly used, the so-called cell filters and the automatic filters; the former comprised of special trays containing masses of filtering material which were placed in the air conduit, and the latter were generally in the form of an endless moving belt having washing devices associated therewith. Oil was used for cleaning, and therefore the filtering medium was usually of a metallic composition.

The filters were difficult or impossible to clean, and their efficiency was always questionable for many reasons, such as too high a velocity causing the air to become charged with the oil, the velocity being so low that the dust particles would not impinge and adhere to the oil surface, the oil becoming too warm, or so cold in the winter that the filter could not function.

In this invention, the impingement principal operation is abandoned and reversion is had to the true filtering process. The filtering medium is a fibrous or paper-like material, preferably fire-proof, and the material is folded and supported in spaced convolutions across the air conduit so that the air is constrained to pass through the thickness of the paper. The paper used is readily pervious to the air, but has sufficient density and absorbing qualities to retain the finest particles of dust or soot and also eliminate the odors.

The main objects of this invention are to provide means for thoroughly cleaning air or gas at low cost; to provide such a means which is available for both small and large volumes of air; to provide such a means which is not unduly bulky and which does not require special building construction for installation; to provide an air cleaner in which the troublesome cleaning is obviated; to provide an efficient filter having no moving parts; to provide an air filter which offers a low resistance to the air flow; and to provide an air filter in which the filtering material is inexpensive, so that it may be discarded and replaced by new material.

An illustrative embodiment of this invention is shown in the accompanying drawings, in which:—

Figure 1 is a cross section of the filtering unit which is placed in and becomes a section of the air ventilating conduit, the filtering paper being omitted.

Fig. 2 is a side elevation of the upper portion of Fig. 1, on a large scale, with parts broken away.

Fig. 3 is an enlarged fragmental section of the filter, with the filtering material in position.

Fig. 4 is a section on the line 4—4 of Fig. 3, showing but one side of the unit.

Fig. 5 is a perspective view of the sliding tray which holds the filter paper in position.

Fig. 6 is a detailed section taken on the line 6—6 of Fig. 4, showing the details of the spring button which holds the tray in position.

Fig. 7 is a cross section through the filtering means taken on the line 7—7 of Fig. 3.

The filtering unit of this invention is particularly adapted for using the fibrous or paper-like filtering material shown and described in applicant's co-pending application Serial No. 211,949, filed of even date herewith.

In the form shown in the drawings there is provided a rectangular open-ended frame conduit section 1 in which the structure may be installed, and the frame inserted as a unit in the air passage. The filter paper 2 is supported across the frame in a plurality of spaced folds, so as to provide a very large area of filtering surface in proportion to the cross sectional area of the frame or conduit 1. Preferably the paper is supported in a zigzag formation, with a strip of open work or wire mesh fabric for re-enforcing the paper against a heavy suction. The air enters from the left, in Fig. 3, into the wide openings of the mouths of the pockets formed by the convolutions, and flows through the filtering paper as the air passes into the narrower ends of the pockets which are the least efficient for filtering.

The frame 1 is provided with two vertically disposed rows of horizontal bars 4 and 12 which are in spaced parallel relation and the bars in one row are staggered with respect to the bars of the other row. A plurality of angle irons 14 are attached to the opposite side walls of the frame by screws or the like, and are arranged in zig-zag position so as to substantially extend between the supporting bars 4 and 12 as shown particularly in Figs. 1 and 3.

A reinforcing fabric 11, such as wire screen, is mounted within the frame 1 and is wound back and forth around the supporting bars 4 and 12 in zig-zag relation with the horizontal edges of the netting resting on and secured to the laterally projecting flange of the angle irons 14. This netting provides a supporting frame or surface for the fibrous or paper-like sheet of filtering material 2.

Clamps in the form of bars 5 and 6 are provided at the top and bottom respectively of the frame for engaging the ends of the sheet of filtering material. Thumb screws 13 press the clamping bars securely against the edges of the frame work for binding the filtering material in position.

Means are provided for shoving the folds of paper back into the V-shaped recesses formed by the wire netting 11 and comprise a plurality of rectangular frames 7, three sides of which are rigidly formed while the fourth side is formed by a roller 10 journalled between the side arms 7A of the frame. The frames 7 are guided and held in position by a plurality of outwardly facing channel members 8 which are disposed in horizontal alinement with the supporting bars 12 and which are adapted to embrace the side arms 7A of the frame 7.

The frames are retained in position by means of spring-pressed buttons 15 which project through the webs of the channel members 8, and engage in suitable receiving recesses 16 in the sides of the frames 7. The buttons 15 are mounted in cup-shaped housings 18 which are countersunk in the side walls of the frame, compression springs 17 being provided under the buttons for pressing them outwardly.

In mounting the paper, the upper end of the paper is inserted under the clamp 5 which is then tightened down by means of the wing nut 13. The frames 7 are then shoved in one at a time, starting at the top, to form the folds in the paper, and to draw the same into place. When the slidable frames 7 are all inserted, the lower end of the paper is secured by means of the clamp 6.

It is now manifest that the sheet of paper may be easily mounted in position, or removed. A large area of paper is provided so that the filter has a low resistance in respect to the cross sectional area of the conduit. No oil or other washing material is used; the action of the filter is very thorough and is not materially effected by the rate of the air flow, or by the prevailing temperatures. The construction is relatively inexpensive and can be easily built in any size which may be required for ventilating systems which are already in use.

While but one specific embodiment of this invention has been herein shown and described, it will be understood that details of the construction shown may be altered or omitted without departing from the spirit of this invention as defined by the following claims.

I claim:

1. In an air conduit, means for inserting and supporting a sheet of filtering material across the conduit comprising stationary bars mounted in spaced relation, and frames slidably mounted on said conduit between said bars for shoving the folds of the material between the bars and supporting the folds in spaced relation.

2. In an air conduit, means for supporting a sheet of filtering material in the conduit comprising stationary bars extending across the conduit in spaced relation, and frames slidably mounted on the walls of the conduit for shoving the folds of the sheet between the bars.

3. In an air filter, a conduit, clamps mounted across the top and bottom of the conduit for holding the ends of a sheet of filtering material, stationary bars extending across the conduit, and frames slidably mounted on the conduit for shoving the folds of the sheet between said bars.

4. In combination in an air conduit, stationary bars extending across the conduit in staggered relation, a strip of foraminated fabric supported on the bars in zigzag form, angle members secured to the walls of the conduit along the edges of the fabric, at one side thereof, and a sheet of pervious filtering material supported against the opposite side of the fabric.

5. In combination in an air conduit, stationary bars in staggered relation extending across the conduit, a strip of foraminated fabric supported on the bars in zigzag form, angle members secured to the walls of the conduit along the edges of the fabric, a sheet of pervious filtering material, and means slidably mounted on the walls of the conduit for shoving the sheet into the convolutions of the fabric and supporting the sheet against the fabric.

6. In combination in an air conduit, a strip of foraminated fabric supported across the conduit, a sheet of filtering paper, and means comprising frames slidably mounted on the walls of the conduit for removably supporting the paper against the fabric.

7. In combination in an air conduit, stationary bars in staggered relation extending across the conduit, a strip of foraminated fabric supported on the bars in zigzag form, a sheet of pervious filtering material, and means slidably mounted on the walls of the conduit for shoving the sheet into the convolutions of the fabric and supporting the sheet against the fabric.

8. In combination in an air conduit, stationary bars comprising concave inner sides and convex outer sides, extending across the conduit in staggered relation, a strip of foraminated fabric extending around the convex side of said bars in zigzag form, a sheet of pervious filtering material and means slidably mounted on the walls of the conduit comprising a frame having an end roller thereon for shoving the sheet into the convolutions of the fabric and clamping the filtering material against the concave sides of the bars for supporting the filtering material against the fabric.

9. In combination in an air conduit, two sets of stationary bars extending across the conduit with the bars in one set in staggered relation to those of the other, a strip of foraminated fabric supported on the bars in zigzag form, at one side of one set thereof and at the other side of said other set, and a sheet of pervious filtering material supported against the fabric at one side of said bars.

10. In combination in an air conduit, a screen supported across the conduit in zigzag form, cleats on the side of said conduit along the edges of the screen for preventing leakage of material between the edges of the screen and the sides of the conduit, a sheet of filtering paper, and means for removably supporting the filtering paper against the screen, and in overlapping relation to portions of said cleats to prevent leakage between the edges of the filtering paper and the sides of the conduit.

Signed at Chicago this 6th day of Aug., 1927.

HANS E. BIRKHOLZ.